Figure 1:
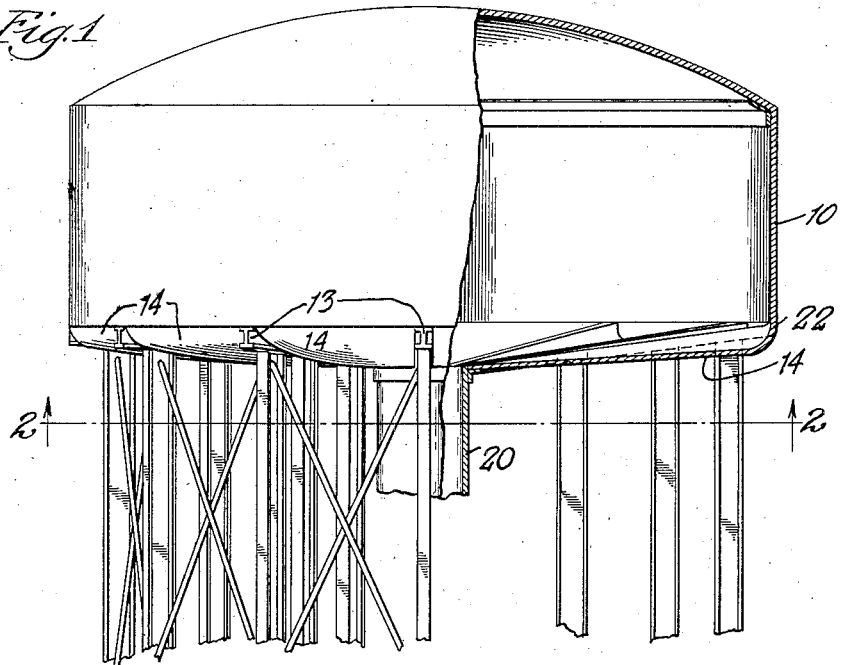

Feb. 9, 1932.    G. T. HORTON    1,844,854
TANK
Filed April 18, 1929    6 Sheets-Sheet 1

Inventor:
George T. Horton,

Feb. 9, 1932. G. T. HORTON 1,844,854
TANK
Filed April 18, 1929 6 Sheets-Sheet 2
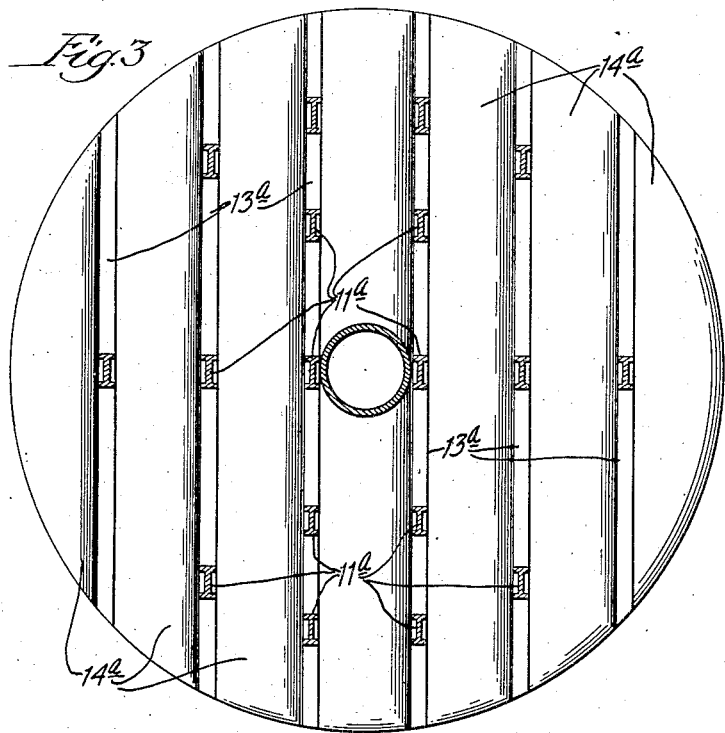
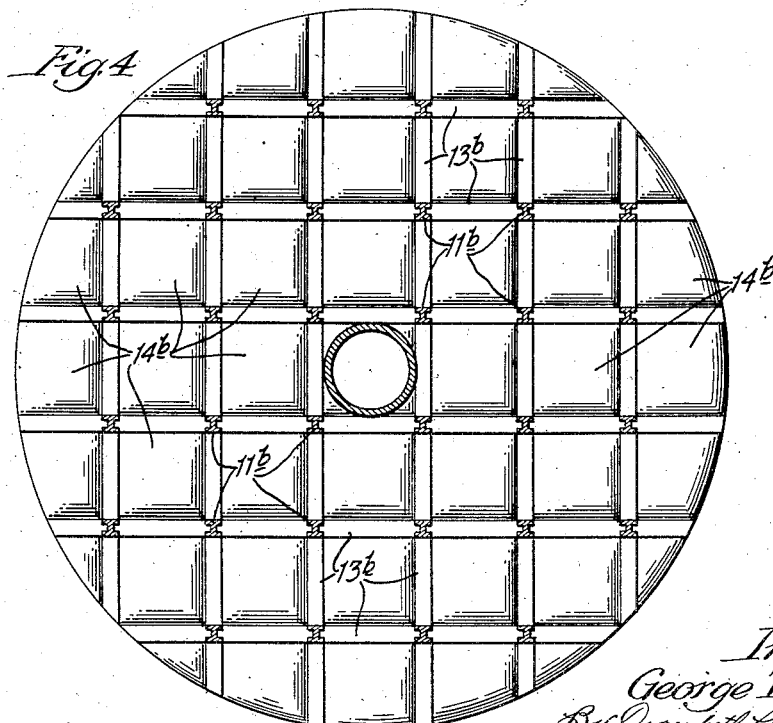
Inventor:
George T. Horton Feb. 9, 1932.　　　　G. T. HORTON　　　　1,844,854
TANK
Filed April 18, 1929　　6 Sheets-Sheet 4

Inventor:
George T. Horton,
Attys.

Feb. 9, 1932.  G. T. HORTON  1,844,854
TANK
Filed April 18, 1929  6 Sheets-Sheet 5

Inventor:
George T. Horton,

Feb. 9, 1932.  G. T. HORTON  1,844,854
TANK
Filed April 18, 1929    6 Sheets-Sheet 6

Patented Feb. 9, 1932

1,844,854

UNITED STATES PATENT OFFICE

GEORGE T. HORTON, OF CHICAGO, ILLINOIS

TANK

Application filed April 18, 1929. Serial No. 356,144.

This invention relates to improvements in tanks, and more especially elevated tanks such as, for example, are commonly used for the storage of water.

One of the features of my invention is the provision of such a tank having a relatively flat bottom made of sheet metal plates in which said plates takes some tensional stress.

In tanks of the character referred to, it is advantageous to have the bottom as flat as possible so as to keep as much water as possible above the desired head. If such a bottom, however, is made of sheet metal plates absolutely flat, the points of support therefor must be very close together, or the plates must be very thin. In carrying out my invention, I convex the bottom plates downwardly between the places of support, thereby imposing a tensional stress on said plates between the places of support, thus permitting the use of relatively thinner plates for the bottom than if said plates were absolutely flat. In other words, the bottom of my improved tank is made of sheet metal plates which, it may be said, are convexed, convexed curved, or bulged downwardly between the places of support.

In an elevated tank of the character described, there must be a certain amount of support on posts with or without cross members and these may be distributed as desired. That is, instead of carrying all the weight at the periphery (with possibly a support in the center) I make the posts somewhat smaller and distribute them over the entire area of the bottom. Then, either with or without cross supports, I convex the bottom plates downwardly between the places of support so as to impose some tensional stress on said plates. If all the posts are arranged at the periphery, the bottom is usually permitted to bulge down very much, being either hemispherical or ellipsoidal in shape so that much of the water is below the desired head, or if the bottom is made absolutely flat the plates must be very heavy and thick, or there must be very strong cross supports. By the use of my invention, I distribute the posts more uniformly over the entire area of the bottom, making them correspondingly smaller, and then by sagging or convexing the plates slightly downwardly between the places of support, I get a bottom that is substantially flat at very little cost.

In those forms of devices embodying the features of my invention, shown in the accompanying drawings:—

Figure 2:
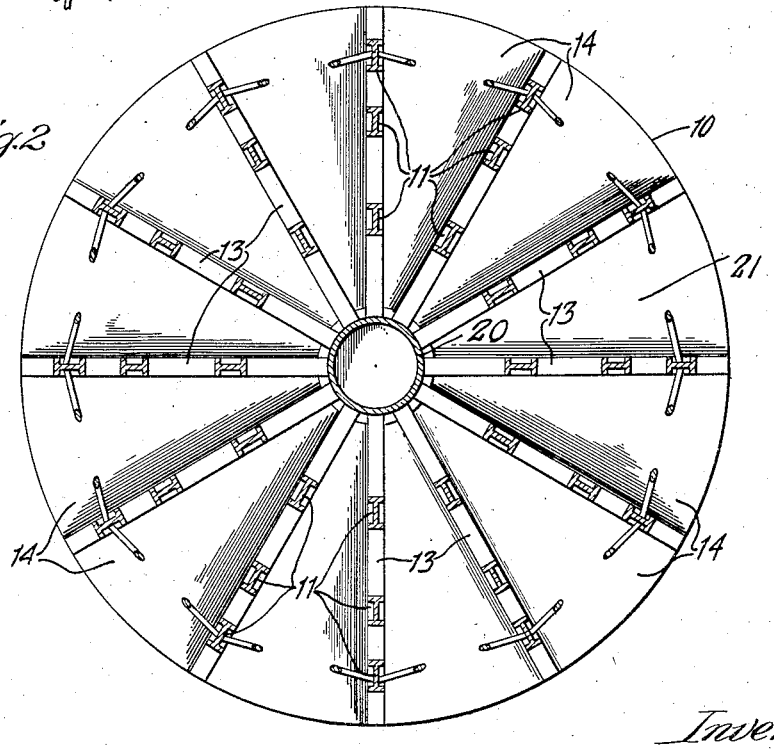
Figure 8:
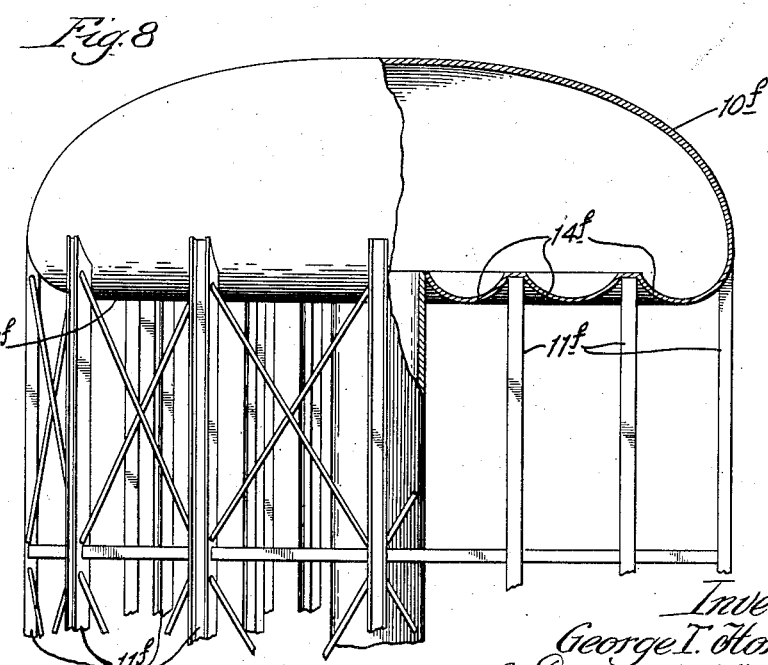
Figure 9:
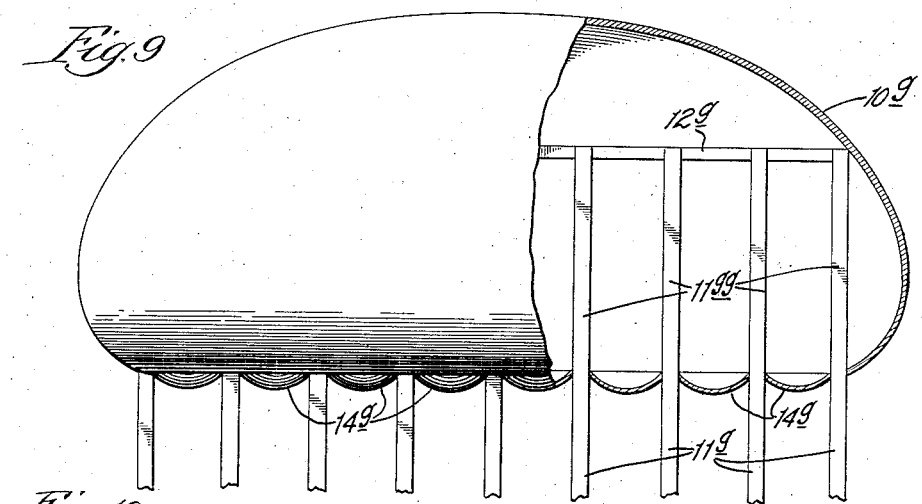

Figure 1 is a view, partly in elevation and partly in section; Fig. 2 is a view taken as indicated by the line 2 of Fig. 1; Figs. 3, 4, 5, 6 and 7 are diagrammatic views similar to Fig. 2 showing modifications; Figs. 8 and 9 are views similar to Fig. 1 showing modifications, and Figs. 10 and 11 are views similar to Fig. 2, showing modifications.

Figure 10:
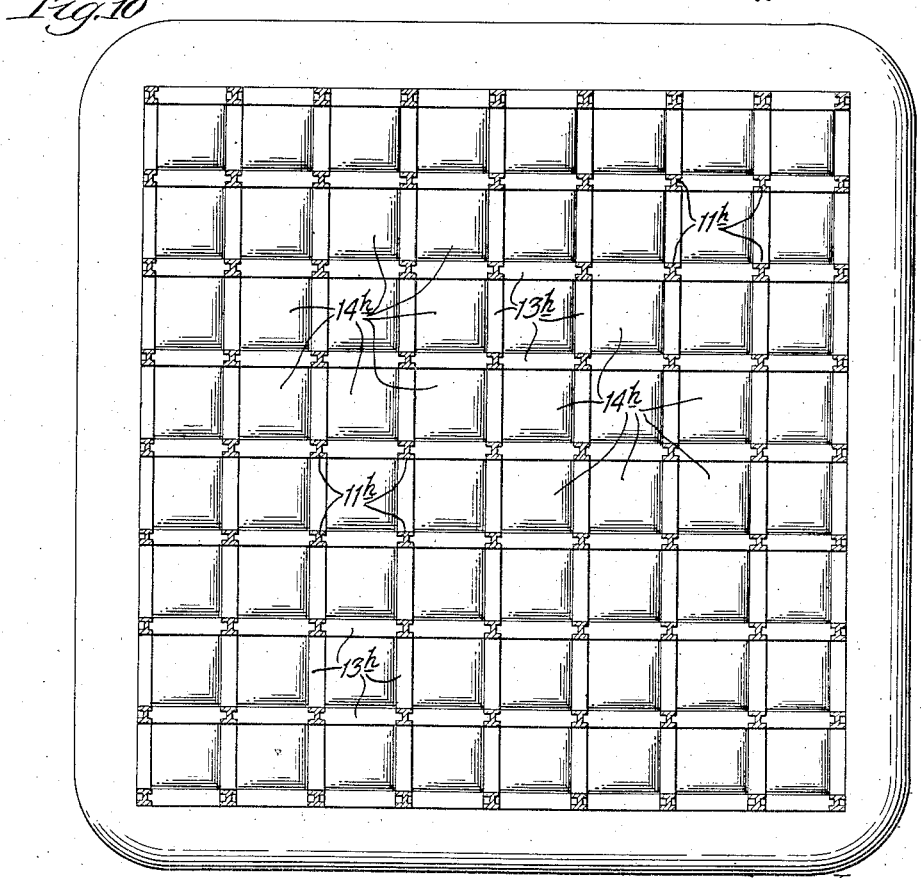
Figure 11:
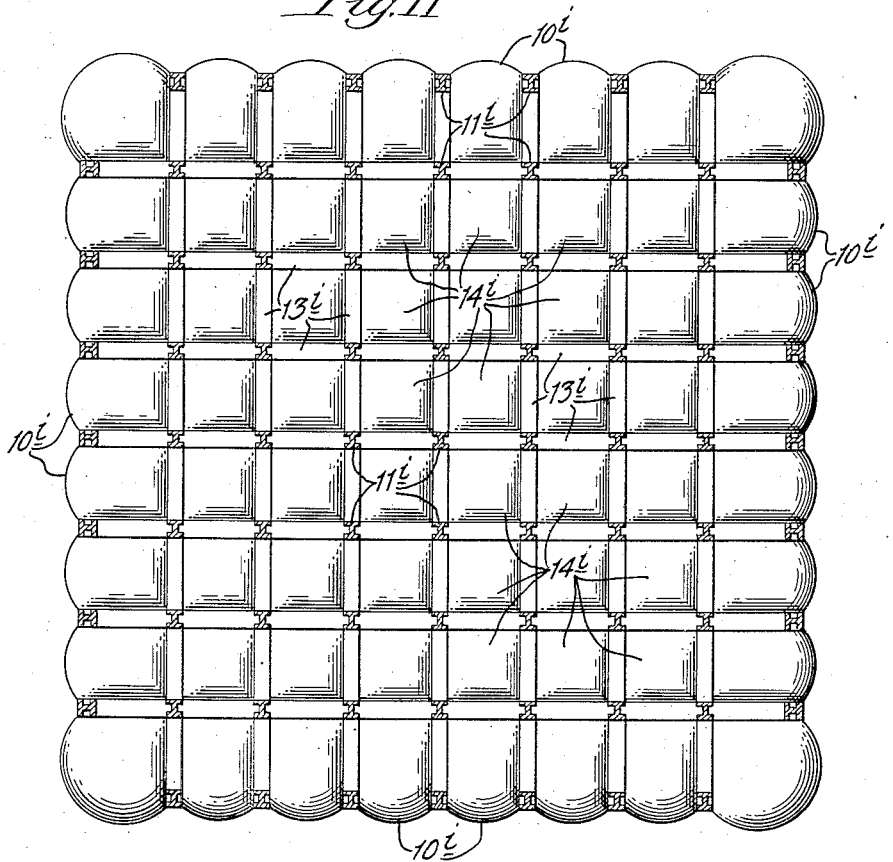

As shown in the drawings, the invention may take various forms, for example, as shown in Figs. 1 and 2, 10 indicates a cylindrical tank supported by the posts 11 distributed over the area of the bottom, as shown. On the tops of these posts are carried horizontal supports 13 radially arranged.

The bottom of the tank is made of sheet metal plates which are convexed downwardly between the supports 13, as indicated by 14. In other words, the bottom is composed of sector-shaped plates convexed, bulged or bowed downwardly between the members 13 to form protuberances as indicated by 14.

In the remaining figures, corresponding parts contain corresponding numbers, except that the various modifications are indicated $a$, $b$, $c$, etc. That is, for example, in the form shown in Fig. 3, the parts $14^a$ correspond with the part 14, shown in Figs. 1 and 2.

In the device shown in Fig. 3, the posts $11^a$ are arranged to carry the parallel horizontal support $13^a$ and the bottom plates are convexed downwardly between the same, as indicated by $14^a$.

In the form shown in Fig. 4, the posts $11^b$ carry cross horizontal supports $13^b$ and the bottom plates are convexed downwardly in squares, as indicated by $14^b$.

Figure 5:
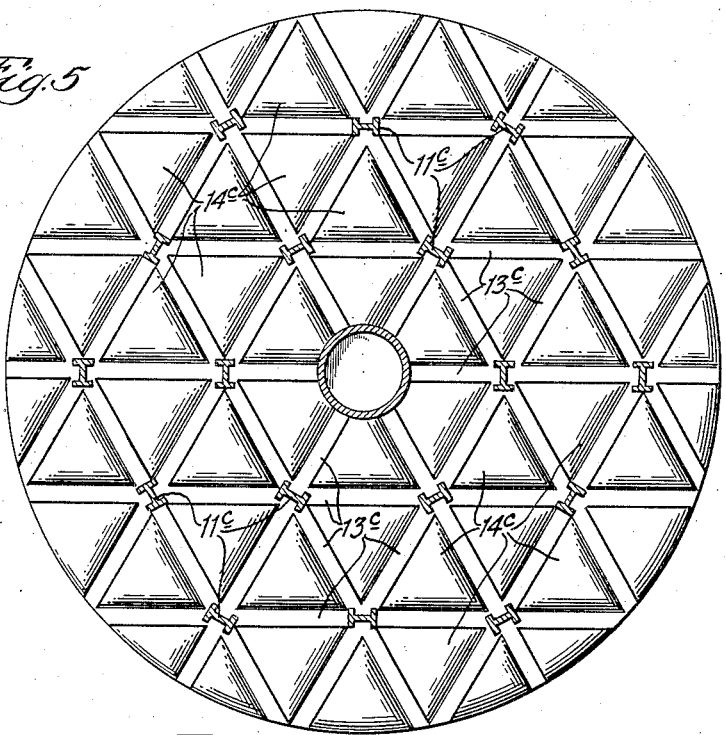

Similarly, in the device shown in Fig. 5, the posts $11^c$ carry cross horizontal supports $13^c$ to form triangular sections, the latter being closed by the convexed bottom plates $14^c$.

Figure 6:
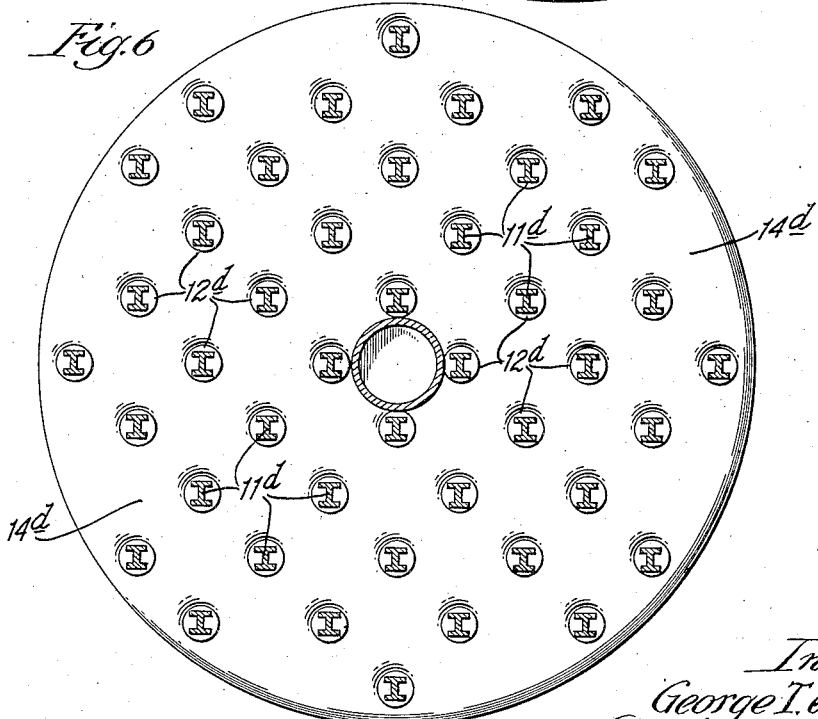

In the form shown in Fig. 6, the horizontal cross members 13 are dispensed with, the ends of the posts 11ᵈ bearing against the bottom and being preferably provided at their upper ends with circular bearing plates 12ᵈ. The bottom plates 14ᵃ are convexed downwardly between the points of support. That is, in general, in the construction shown in Fig. 6, the arrangement is similar to the formation that would be made if a canvas or fabric were stretched out rather flat, filled with water, and then held up at various points underneath by the upper ends of posts.

Figure 7:
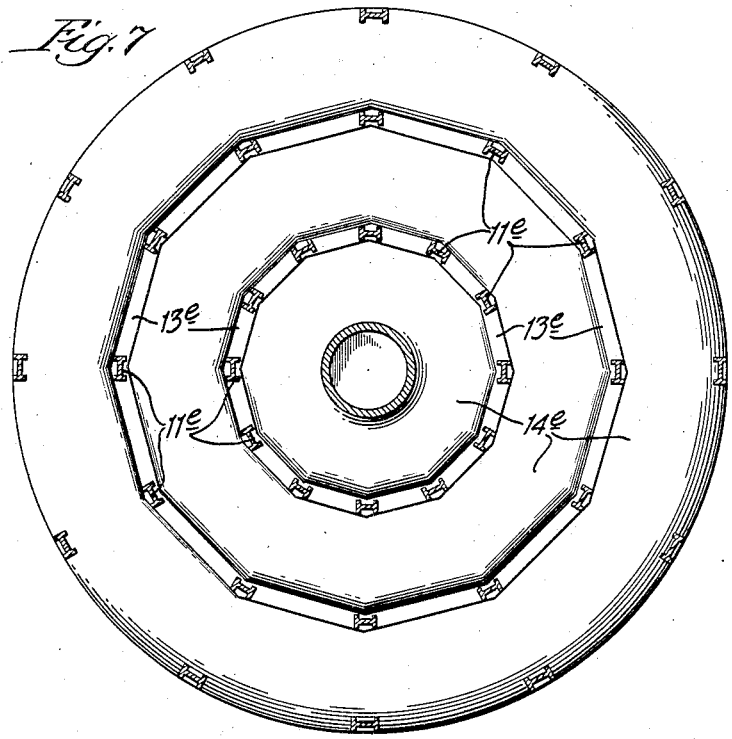

In the form shown in Fig. 7, the posts 11ᵉ have at their tops concentrically arranged substantially circular horizontal supports 13ᵉ, and the bottom plates 14ᵉ are convexed downwardly between the same in concentric circles.

The form shown in Fig. 8 is similar to that shown in Fig. 6, except that the tank 10ᶠ is not cylindrical, but above the bottom is substantially spheroidal in form. In this device, as here shown, the bottom 14ᶠ is made of sheet metal plates having a multi-point support on the upper ends of the posts 11ᶠ. Between said posts, the bottom plates are convexed downwardly, as shown.

The form shown in Fig. 9 is similar to that shown in Fig. 8, except that the posts 11ᵍ are extended upwardly inside of the tank, as indicated by 11ᵍᵍ carrying at their upper ends a structure 12ᵍ to assist in supporting the upper part of the tank 10ᵍ.

In Fig. 10, I have illustrated the invention as applied to a square tank. Here the posts are indicated by 11ʰ. On top of these posts are cross horizontal supports 13ʰ, and the bottom plates are convexed downwardly in squares between the same, as indicated by 14ʰ.

The device shown in Fig. 11 is similar to that shown in Fig. 10, except that the sides of the tank above the bottom between the ends of the horizontal supports 13ⁱ are convexed or bowed outwardly, as indicated by 10ⁱ.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

In the form shown in Figs. 1 and 2, 20 indicates a centrally arranged riser pipe opening into the bottom. As shown in this form, the bottom is supported by radial members 13. Between these members, the sheet metal bottom is convexed downwardly so that the weight of liquid in the tank will impose a tensional stress on the sheet metal bottom between said radial members 13. These radial members divide the bottom into sector-shaped portions 21. The outer edges of these portions are curved upwardly and attached to the lower edge of the cylindrical side wall 10 at 22.

What I claim as new, and desire to secure by Letters Patent is:

1. An elevated tank having a substantially cylindrical side wall and a substantially flat sheet metal bottom supported by radial members, the sheet metal bottom being convexed downwardly between the radial members, whereby the weight of liquid in the tank will impose a tensional stress on said sheet metal bottom between said radial members.

2. An elevated tank having a substantially cylindrical side wall and a substantially flat sheet metal bottom with a centrally arranged riser pipe entering the same, said sheet metal bottom being supported by members radiating from the riser pipe to the lower edge of the cylindrical side wall, the sheet metal bottom being convexed downwardly between said radial members, whereby the weight of liquid in the tank will impose a tensional stress on said sheet metal bottom between said radial members.

3. An elevated tank as claimed in claim 1, in which the sector portions of the bottom between the radial members are curved upwardly at their outer edges and attached to the lower edge of the cylindrical side wall.

4. An elevated tank as claimed in claim 2, in which the sector portions of the bottom between the radial members are curved upwardly at their outer edges and attached to the lower edge of the cylindrical side wall.

In witness whereof, I have hereunto set my hand this 13th day of April, 1929.

GEORGE T. HORTON.